(12) United States Patent
Michaud

(10) Patent No.: US 12,386,765 B2
(45) Date of Patent: Aug. 12, 2025

(54) METHOD AND SYSTEM FOR A DISAGGREGATED PERSISTENT MEMORY SYSTEM USING PERSISTENT MEMORY SERVERS

(71) Applicant: Dell Products L.P., Round Rock, TX (US)

(72) Inventor: Adrian Michaud, Carlisle, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 17 days.

(21) Appl. No.: 17/828,562

(22) Filed: May 31, 2022

(65) Prior Publication Data

US 2023/0385213 A1 Nov. 30, 2023

(51) Int. Cl.
G06F 13/28 (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 9,405,566 B2* | 8/2016 | Chawla | G06F 13/36 |
| 10,244,069 B1* | 3/2019 | Michaud | H04L 69/40 |
| 10,817,447 B2* | 10/2020 | Vakharwala | G06F 12/1027 |
| 11,451,476 B2* | 9/2022 | Shalev | H04L 69/10 |
| 11,656,916 B2* | 5/2023 | Kakaiya | G06F 9/4812 |
| | | | 709/239 |
| 11,784,990 B2* | 10/2023 | Kida | G06F 9/5083 |
| 2016/0267052 A1* | 9/2016 | Metzler | G06F 15/17331 |
| 2016/0299702 A1* | 10/2016 | Chawla | G06F 3/0685 |
| 2017/0187629 A1* | 6/2017 | Shalev | H04L 61/5007 |
| 2018/0137069 A1* | 5/2018 | Vakharwala | G06F 12/1081 |
| 2019/0363989 A1* | 11/2019 | Shalev | H04L 69/22 |
| 2020/0065297 A1* | 2/2020 | Taylor | G06F 16/27 |
| 2020/0218684 A1* | 7/2020 | Sen | G06F 13/4027 |
| 2020/0401404 A1* | 12/2020 | Robillard | G06F 3/067 |
| 2021/0064489 A1* | 3/2021 | Robillard | G06F 11/3034 |
| 2021/0132870 A1* | 5/2021 | Bono | G06F 3/065 |
| 2022/0100581 A1* | 3/2022 | Lal | G06F 9/5083 |
| 2022/0103536 A1* | 3/2022 | Kida | H04L 9/0825 |
| 2023/0029380 A1* | 1/2023 | Hyatt | G06F 9/5072 |
| 2023/0231811 A1* | 7/2023 | Dalal | G06F 13/1605 |
| | | | 710/308 |
| 2023/0251912 A1* | 8/2023 | Kakaiya | H04L 51/226 |
| | | | 709/239 |
| 2023/0396599 A1* | 12/2023 | Kida | G06F 9/5083 |
| 2024/0028530 A1* | 1/2024 | Ki | G06F 16/134 |
| 2024/0236058 A1* | 7/2024 | Kida | H04L 9/3242 |

* cited by examiner

*Primary Examiner* — Henry Tsai
*Assistant Examiner* — Christopher A Bartels
(74) *Attorney, Agent, or Firm* — Chamberlain, Hrdlicka, White, Williams & Aughtry; Aly Z. Dossa

(57) ABSTRACT

A system for managing data includes a client device, a remote direct memory access (RDMA) fabric network, and a persistent memory (PMEM) system comprising a plurality of PMEM servers, wherein a RDMA fabric device of the RDMA fabric is programmed to: obtain a RDMA request, associated with the data, from the client device, wherein the RDMA request specifies a PMEM address of a PMEM region, identify a PMEM server of the plurality of PMEM servers based on the PMEM address, and access the PMEM region using the PMEM server to service the RDMA request.

15 Claims, 11 Drawing Sheets

METHOD AND SYSTEM FOR A DISAGGREGATED PERSISTENT MEMORY SYSTEM USING PERSISTENT MEMORY SERVERS

BACKGROUND

Computing devices may include any number of internal components such as processors, memory, and persistent storage. Each of the internal components of a computing device may be used to generate data. The process of generating, storing, and transferring data may utilize resources of the computing devices such as processing and storage. The utilization of the aforementioned resources to generate, store, and transfer data may impact the overall performance of the resources.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
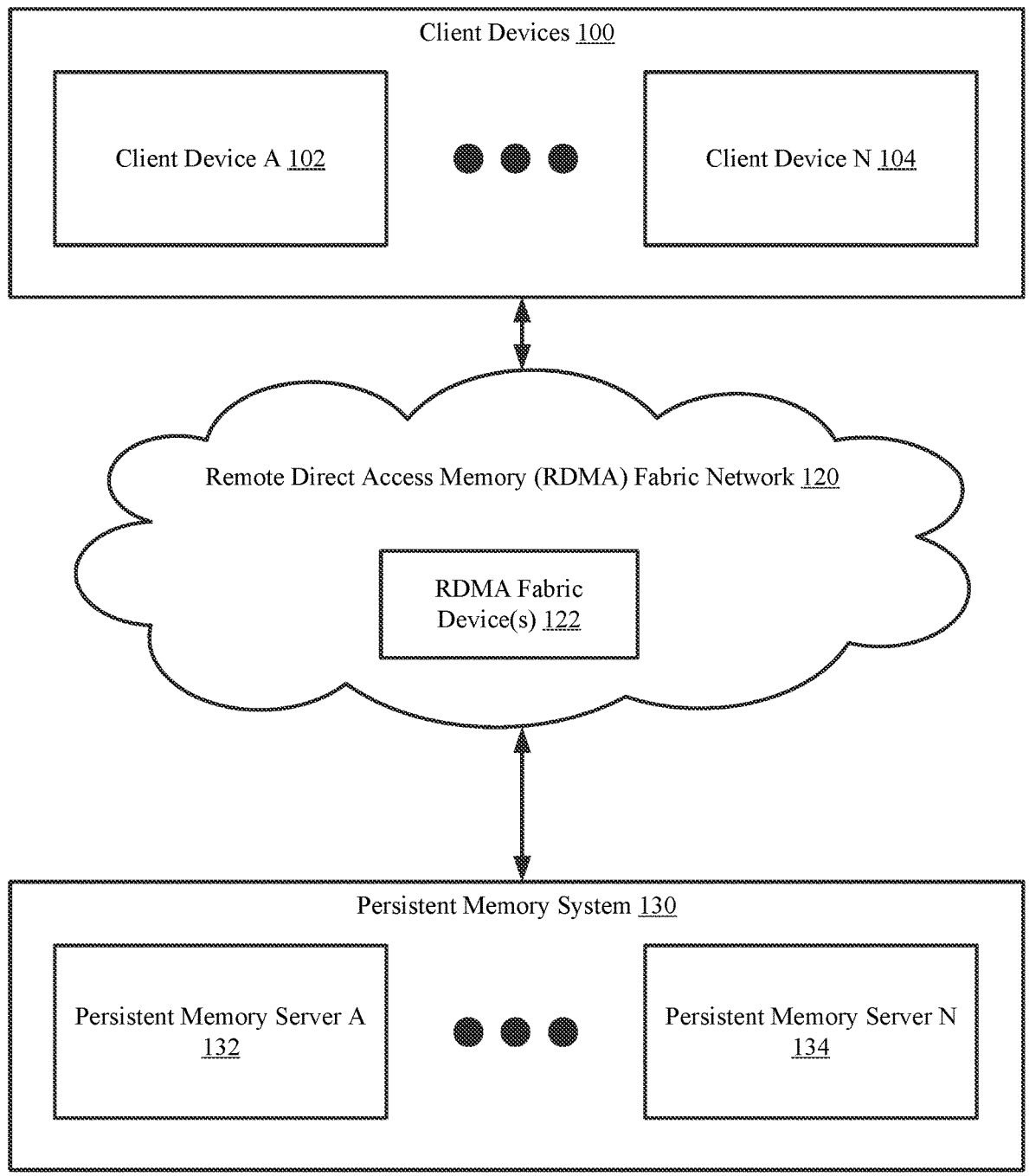
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N, A to P, A to M, or A to L. As used herein, the aforementioned labeling means that the element may include any number of items and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

In general, embodiments of the invention may relate to a method and system for utilizing resource devices. Embodiments of the invention may include utilizing a persistent memory system that stores, in persistent memory, data for applications executing on client devices operatively connected to the persistent memory system via a remote direct memory access (RDMA) fabric. The persistent memory system may include any number of persistent memory servers. Each persistent memory server may store a persistent memory region that comprises persistent memory. The client devices may manage a virtual memory address space that maps a virtual region of memory to one of the persistent memory regions.

In one or more embodiments, the client devices may utilize the virtual memory address space to access (e.g., write data to or read data from) the persistent memory regions. A virtual memory manager may obtain application requests from the applications that specify accessing data in memory, identifying the corresponding memory address in the corresponding persistent memory region, and sending a RMDA request to a network device of the RDMA fabric to access the data in memory.

The network device (also referred to as a RDMA fabric device) of the RDMA fabric may obtain the RDMA request, identify the persistent memory address of the memory region, and access the data in the identified persistent memory address to service the RDMA request. The servicing may include writing data to the persistent memory address region, reading data from the persistent memory address region, and notifying the client device of the servicing.

Various embodiments of the invention are described below.

FIG. 1A shows an example system in accordance with one or more embodiments of the invention. The system includes one or more client devices (100), a persistent memory system (130) that includes one or more persistent memory servers (132, 134), and a RDMA fabric network (120) operatively connected to each of the client devices (100) and the persistent memory system (130). The components in the system may be operably connected via any combination of wired and/or wireless connections. The system may include additional, fewer, and/or different components without departing from the invention. Each component in the system is operably connected via any combination of wired and/or wireless connections.

In one or more embodiments of the invention, the client devices (100) provide services to users operating the client devices (100). The services may be provided using applications executing on the client devices (100). The applications may utilize data stored in memory. The applications (further discussed in FIG. 1B) may utilize data stored in persistent memory by the persistent memory system (130). The client devices (100) may access such data using a connection to the persistent memory system (130) via the RDMA fabric network (120).

Figure 5:
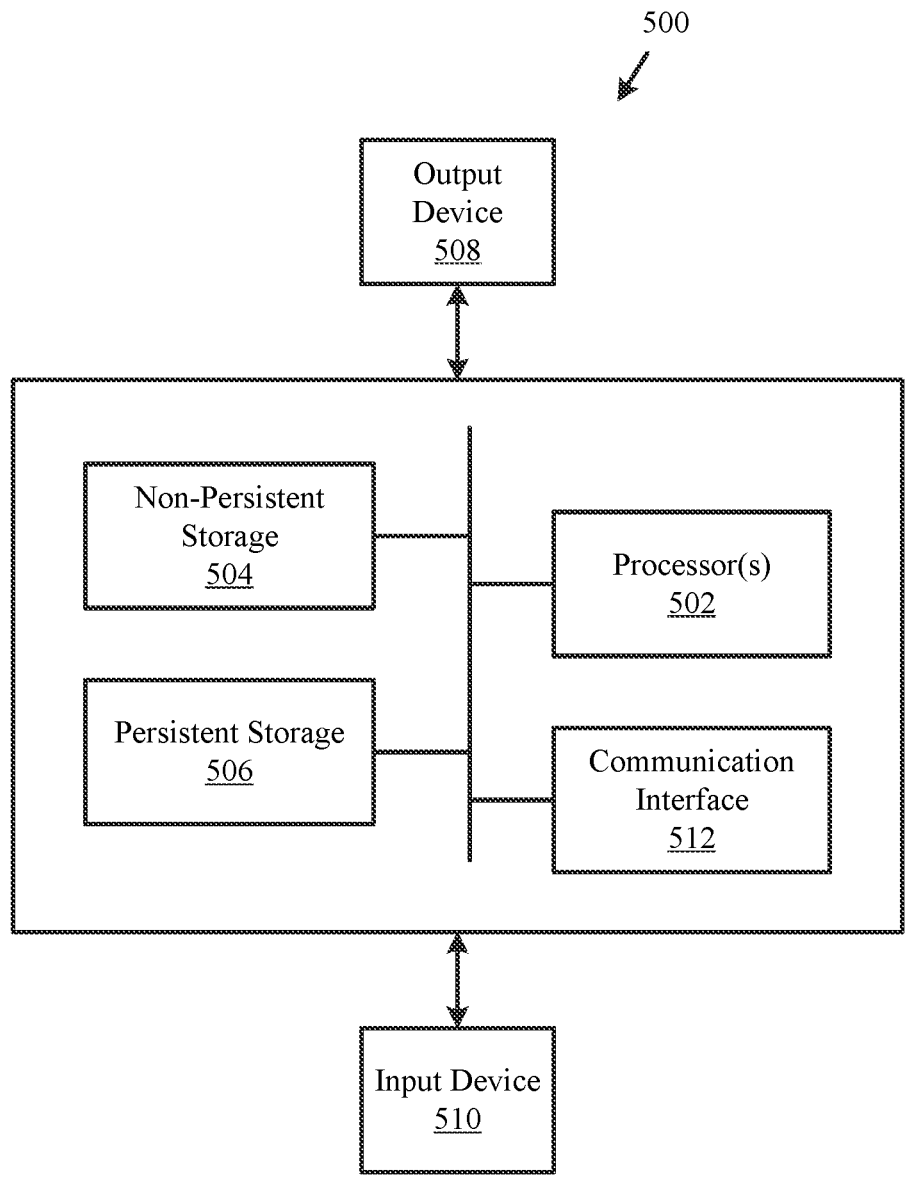
FIG. 5 shows a diagram of a computing device in accordance with one or more embodiments of the invention.

In one or more embodiments, each of the client devices (102, 104) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device (102, 104) described throughout this application and/or all, or a portion thereof, of the method described in FIG. 3A.

In one or more embodiments of the invention, one or more of the client devices (102, 104) is implemented as a logical device. The logical device may utilize the computing resources of any number of computing devices and thereby provide the functionality of the client device (102, 104) described throughout this application and/or all, or a portion thereof, of the method described in FIG. 3A. For additional details regarding a client device (102, 104), see, e.g., FIG. 1B.

In one or more embodiments of the invention, the RDMA fabric network (120) includes one or more RDMA fabric devices (122) operatively connected to at least one of the client devices (102, 104) and one or more of the persistent memory servers (132, 134) of the persistent memory system (130). In one or more embodiments, the RDMA fabric network (120) includes functionality for accessing data in the persistent memory system (130) as requested by the client devices (100). The RDMA fabric devices (122) may access the data from the memory devices of the persistent memory servers (132, 134). For example, the RDMA fabric devices (122) may access the memory devices using RDMA. In one or more embodiments of the invention, RDMA is a mechanism for directly accessing memory stored in a remote location (e.g., in the persistent memory system (130). RDMA fabric devices (122) may access the persistent memory servers (132, 134) without departing from the invention. The RDMA fabric devices may perform the method described in FIG. 3B.

In one or more embodiments, the RDMA fabric devices (122) are physical devices that include persistent storage, memory (e.g., random access memory), one or more processor(s) (including a switch chip), and two or more physical ports. In one or more embodiments disclosed herein, the switch chip is hardware that determines which egress port on a network device to forward media access control (MAC) frames. The switch chip may include egress and ingress ports that may connect to ports on the network device. Each port may or may not be connected to another RDMA fabric device on the RDMA fabric network (120) (e.g., a server, a switch, a router, etc.).

In one or more embodiments of the invention, the RDMA fabric devices (122) connect the client devices (100) to the persistent memory system (130) in a non-blocking manner. In other words, each RDMA fabric device (122) in the RDMA fabric network is capable of providing the aforementioned connection without the use of the other RDMA fabric devices (122). For example, one of the RDMA fabric devices (122) includes a direct connection to one of the client devices (102, 104) and a direct connection to a persistent memory server (132). In this manner, this RDMA fabric device may provide the connection between the client device and the persistent memory server without requiring the use of a second RDMA fabric device.

In one or more embodiments of the invention, the communication between the client devices (100) and the persistent memory system (130) may produce negligible latency. In other words, one may estimate minimal latency between a client device (102, 104) and a persistent memory server (132, 134) communicating via the RDMA fabric network (120).

In one or more embodiments of the invention, the persistent memory system (130) is a system used for storing persistent memory to be used by the client devices (100). The persistent memory system (130) may include any number of persistent memory servers (132, 134). Each persistent memory server (132) may store a portion of memory (also referred to as a persistent memory region) that, collectively for all portions of memory, include the memory used by the client devices (100) to store data for the applications of the client devices (100).

In one or more embodiments of the invention, each of the persistent memory servers (132, 134) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the persistent memory servers (132, 134) described throughout this application.

In one or more embodiments of the invention, one or more of the persistent memory servers (132, 134) is implemented as a logical device. The logical device may utilize the computing resources of any number of computing devices and thereby provide the functionality of the persistent memory servers (132, 134) described throughout this application. For additional details regarding a client device (102, 104), see, e.g., FIG. 1B.

Figure 1B:
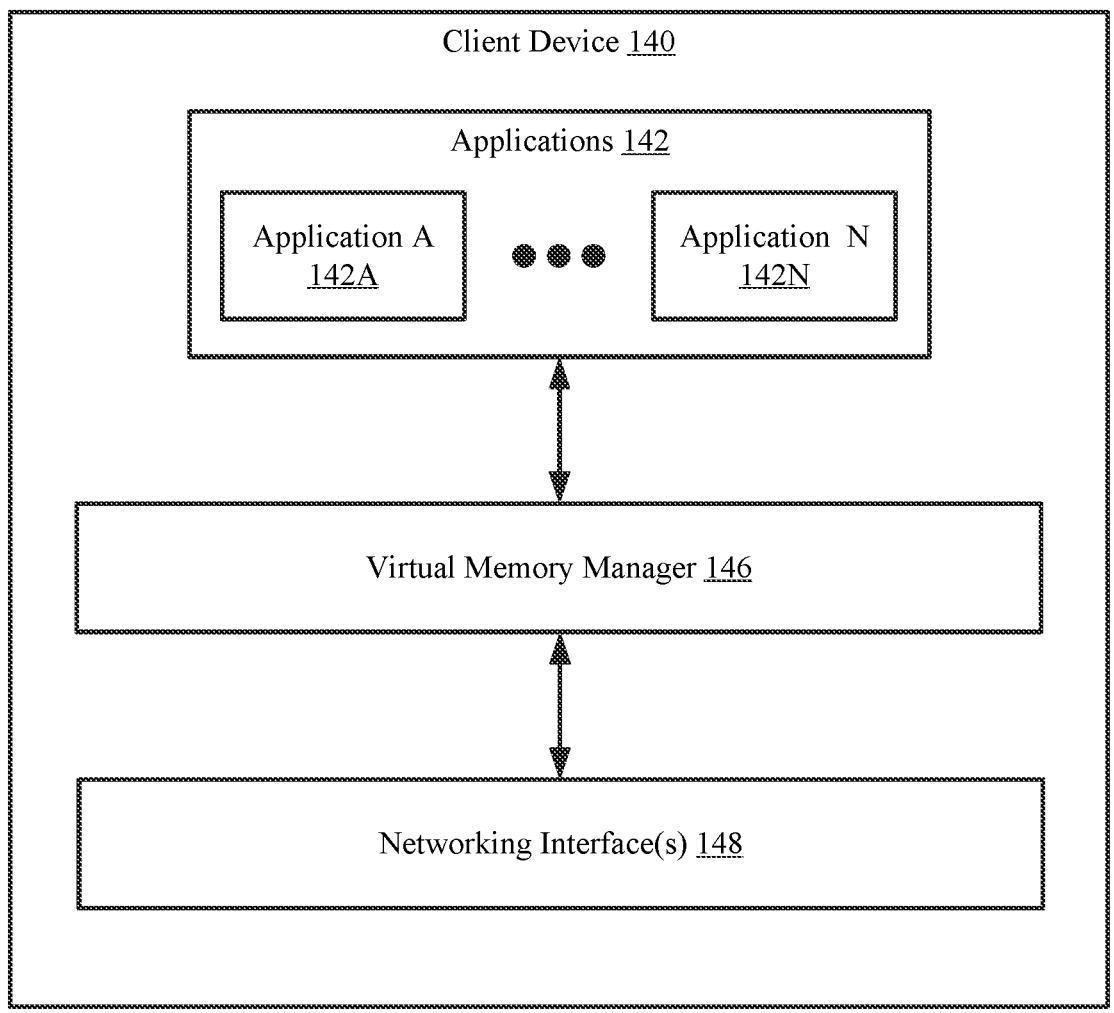
FIG. 1B shows a diagram of a client device in accordance with one or more embodiments of the invention.

While the system of FIG. 1B has been illustrated and described as including a limited number of specific components, a system in accordance with embodiments of the invention may include additional, fewer, and/or different components without departing from the invention.

FIG. 1B shows a diagram of a client device in accordance with one or more embodiments of the invention. The client device (140) may be an embodiment of one of the client devices (102, 104, FIG. 1A) discussed above. The client device (140) may include one or more applications (142), a virtual memory manager (146), and any number of networking interfaces (148). The client device (140) may include additional, fewer, and/or different components without departing from the invention. Each of the components illustrated in FIG. 1B is discussed below.

In one or more embodiments, the applications (142) are logical entities executed using computing resources (not shown) of the client device (140). Each of the applications may be performing similar or different processes. In one or more embodiments of the invention, the applications (142A, 142N) provide services to users. For example, the applications (142) may host components. The components may be, for example, instances of databases, email servers, operating systems, and/or other components. The applications (142) may host other types of components without departing from the invention. An application (142A, 142N) may execute on one or more client devices (e.g., 102, 104, FIG. 1A) as instances of the application.

In one or more embodiments of the invention, the virtual memory manager (146) includes functionality for managing the use of memory by the applications (142). The virtual memory manager (146) manages the use of the memory by providing a virtual memory address space that maps each virtual memory address to a memory address of the persistent memory in the persistent memory system. The virtual memory manager (146) may use the virtual memory address space to provide access to the memory by the applications (142).

For example, the applications (142A, 142N) may send application requests that specify accessing data (e.g., write data or read the data) stored in persistent memory by requesting the data in a virtual memory address. The virtual memory manager (146) may use the virtual memory address space to identify the physical memory address mapped to the requested virtual memory address. For additional details regarding the virtual address memory space, see, e.g., FIGS. 2A-2C. The virtual memory manager (146) may perform the method of FIG. 3A to service the application requests.

Figure 3A:
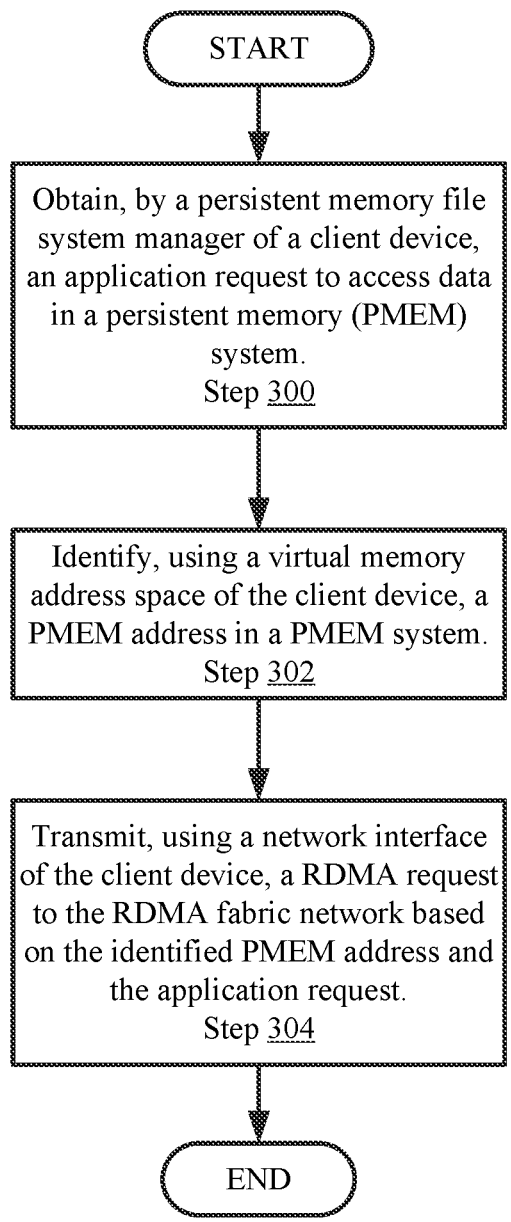
FIG. 3A shows a flowchart for obtaining application requests at a client device in accordance with one or more embodiments of the invention.

In one or more embodiments of the invention, the virtual memory manager (146) is implemented as computer instructions, e.g., computer code, stored on a persistent storage (e.g., of the client device (140)) that when executed by a processor(s) of the client device (140) cause the client device (140) to provide the functionality of the virtual memory manager (146) described throughout this application and/or all, or a portion thereof, of the method described in FIG. 3A.

In one or more embodiments of the invention, the networking interfaces (148) include functionality for providing connection between the client device (140) and one or more RDMA fabric devices (e.g., 122, FIG. 1A) discussed above. In one or more embodiments, networking interfaces (148) may include functionality for obtaining requests issued by the virtual memory manager (146) and transmitting the requests to the RDMA fabric devices. The networking interfaces may be implemented, for example, as RDMA-enabled network interface controllers (RNICs). Each RNIC may manage communication between the client device (140) and one of the RDMA fabric devices in the RDMA fabric network.

In one or more embodiments, the networking interface (148) may be implemented using any suitable interconnection technology including, for example, system buses such as compute express links or other interconnection protocols. The networking interface (148) may support any input/output (IO) protocol, any memory protocol, any coherence interface, etc. The networking interface (148) may support processor to device connections, processor to memory connections, and/or other types of connections. The enhanced networking interface (148) may be implemented using one or more hardware devices including circuitry adapted to provide the functionality of the networking interface (148).

Figure 1C:
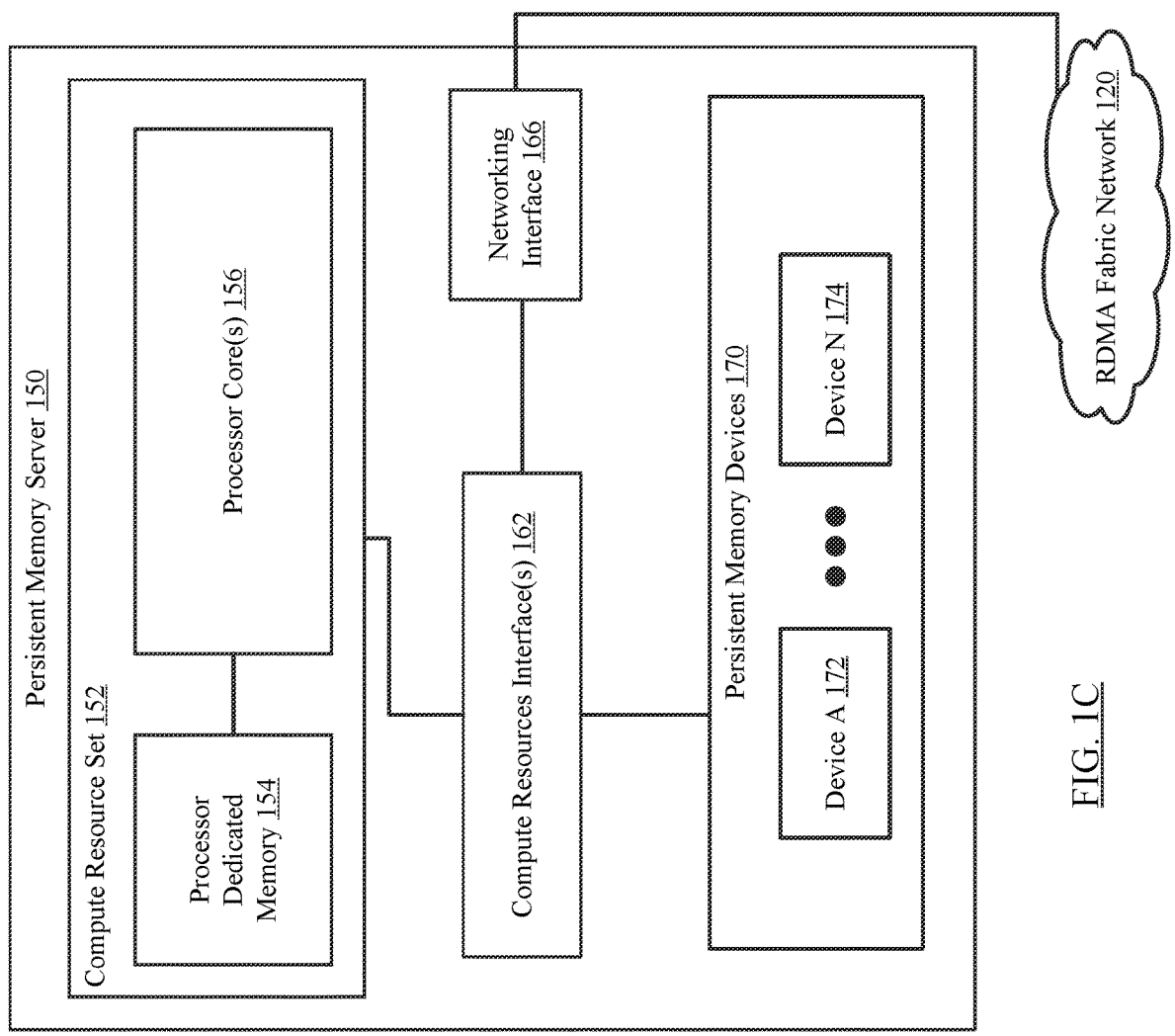
FIG. 1C shows a diagram of a persistent memory server in accordance with one or more embodiments of the invention.

FIG. 1C shows a diagram of a persistent memory server in accordance with one or more embodiments of the invention. The persistent memory server (150) of FIG. 1C may be an embodiment of a persistent memory server (132, 134, FIG. 1A) discussed above. The persistent memory server (150) may include a compute resource set (152) that includes processor dedicated memory (154), one or more processor cores (156), one or more compute resources interfaces (162), a networking interface (166), and one or more persistent memory devices (170). The persistent memory server (150) may include additional, fewer, and/or different components without departing from the invention. Each of the components illustrated in FIG. 1C is discussed below.

In one or more embodiments, the compute resource set (152) may include one or more processor cores (156) operably connected to the processor dedicated memory (154) (e.g., cache). Consequently, the compute resource set (152) may host any number of executing processes thereby enabling any number and type of workloads to be performed. When performing the workloads, the compute resource set (152) may utilize computing resources provided by the hardware of the persistent memory server (150).

The processor cores (156) of the compute resource set (152) may be operably connected to the persistent memory devices (170). For example, the processor cores (156) may be connected to a compute resource interface (162), which is also connected to the persistent memory devices (170).

In one or more embodiments, the processor cores (156) may be operably connected to external resources (e.g., RDMA fabric devices) via the networking interface (166) and the RDMA fabric network (120). Though the operable connection is provided, the processor cores (156) may not utilize the resources of the RDMA fabric network devices. For example, any RDMA requests (discussed in FIGS. 3A-3B) serviced using the persistent memory server (150) may not require the use of the processor cores (156). For additional details regarding the above example, see, e.g., FIGS. 4A-4C.

In one or more embodiments, the compute resource set (152) may be implemented using one or more sockets. In one or more embodiments, a socket is a device that provides direct connection between electrical components (e.g., microprocessors, motherboard, etc.) in a processor. The socket may be arranged, for example, in a pin grid array (PGA) architecture. Each socket may include a set of processor cores, a set of processor dedicated memory, and a connection to one of the compute resources interfaces (162). In such embodiments where the compute resource set (152)

includes two or more sockets, the multiple sockets may provide a connection to the other sockets in the persistent memory server (150) via, for example, a socket interconnect. The socket interconnects may be implemented as, for example, an ultra path interconnect (UPI). Other socket interconnects may be used without departing from the invention.

Examples of compute resource sets include, but are not limited to, single-core CPUs, multi-core CPUs, graphics processing units (GPUs), and field programmable gate arrays (FPGAs).

In one or more embodiments of the invention, the networking interface (166) includes functionality for distributing the storage of data between the persistent memory devices (170) and external components (e.g., RDMA fabric devices in the RDMA fabric network (120)) The networking interface (166) may access the persistent memory devices (170) via one or more compute resources interfaces (162).

The compute resources interface (162) may be implemented using any suitable interconnection technology including, for example, system buses such as compute express links or other interconnection protocols. For example, the compute resources interface (162) may be implemented as a peripheral component interconnect express (PCIe) device. The compute resources interface (162) may support any input/output (TO) protocol, any memory protocol, any coherence interface, etc. The compute resources interface (162) may support processor to device connections, processor to memory connections, and/or other types of connections. The compute resources interface (162) may be implemented using one or more hardware devices including circuitry adapted to provide the functionality of the compute resources interface (162).

The networking interface (166) may be implemented using any suitable interconnection technology including, for example, system buses such as compute express links or other interconnection protocols. The networking interface (166) may support any input/output (TO) protocol, any memory protocol, any coherence interface, etc. The networking interface (166) may support processor to device connections, processor to memory connections, and/or other types of connections. The networking interface (166) may be implemented using one or more hardware devices including circuitry adapted to provide the functionality of the networking interface (166) described herein.

In one or more embodiments, the persistent memory devices (170) are devices that store persistent memory. The persistent memory devices (172, 174) may be implemented as, for example, solid-state memory devices, non-volatile dual in-line memory modules (NVDIMMs), or non-volatile random access memory (NVRAM). The persistent memory devices (170) may be other types of memory devices without departing from the invention. The persistent memory devices (170) may be connected to the persistent memory server (150) via the compute resource interfaces (162).

In one or more embodiments, the persistent memory devices (170) hosts a persistent memory region of the persistent memory system. The persistent memory region may be a portion of the persistent memory provided to the client devices discussed above to store data in persistent memory. For additional details regarding the persistent memory region, see, e.g., FIGS. 2A-2C.

Figure 2A:
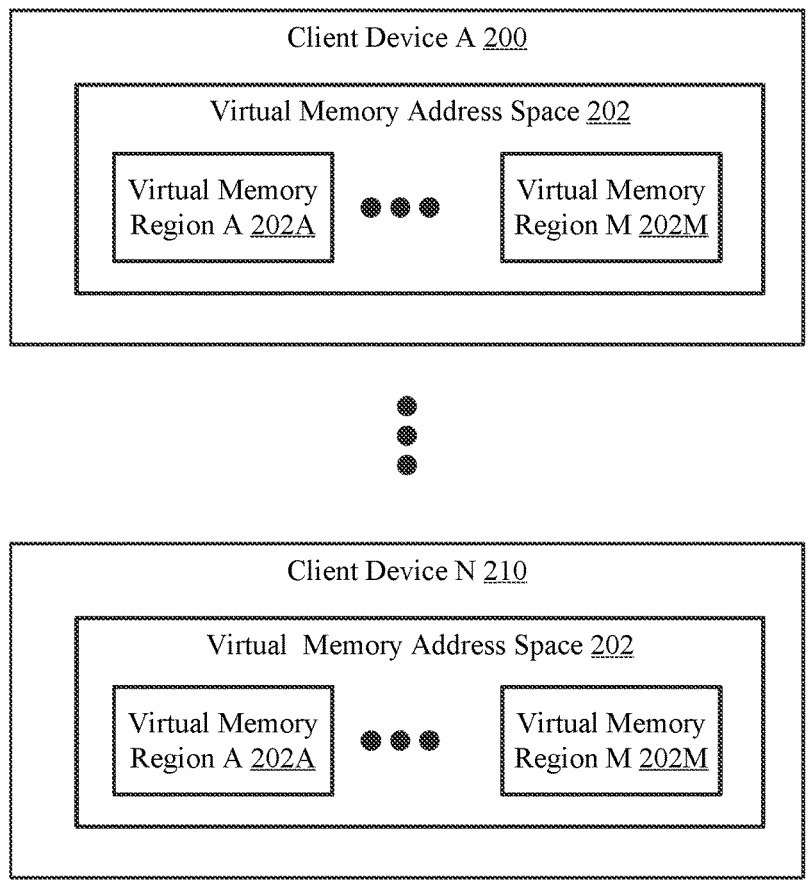
FIG. 2A shows a diagram of a set of client devices in accordance with one or more embodiments of the invention.
Figure 2B:
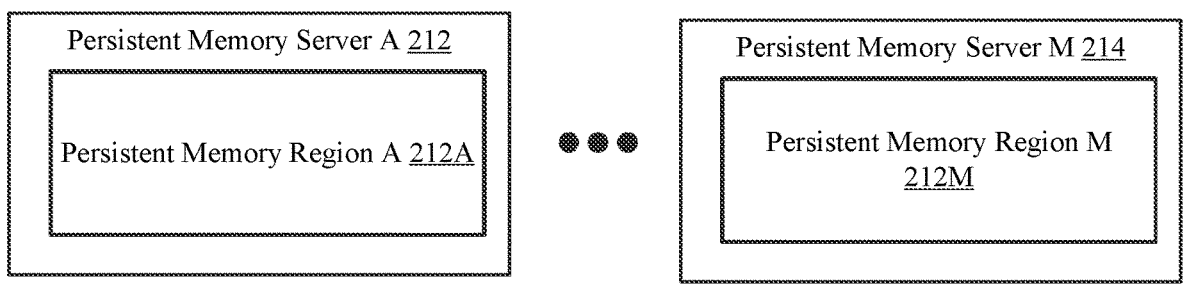
FIG. 2B shows a diagram of a set of persistent memory devices in accordance with one or more embodiments of the invention.
Figure 2C:
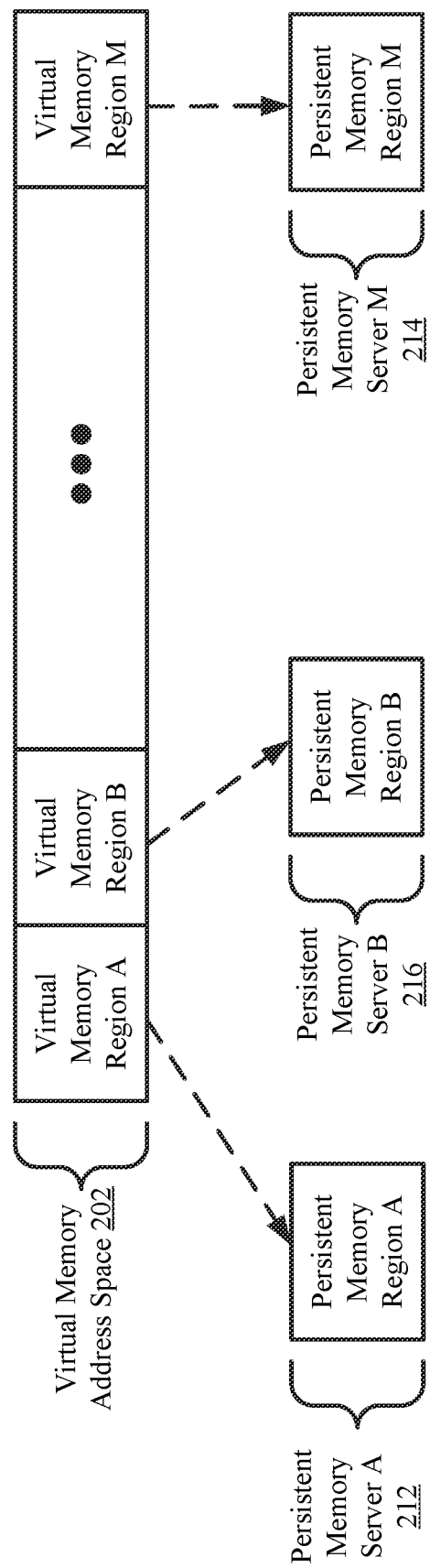
FIG. 2C shows a diagram of a relationship between a virtual memory address space and persistent memory regions in accordance with one or more embodiments of the invention.

To further clarify the relationship between the virtual memory address space and the persistent memory regions, FIGS. 2A-2C show diagrams of the relationships between the virtual memory address space and the persistent memory regions.

Turning to FIG. 2A, FIG. 2A shows a set of client devices. Each client device (200, 210) includes a copy of the virtual memory address space (202). The virtual memory address space (202) may further include virtual memory regions (202A, 202M). The virtual memory regions (202A, 202M) may be further subdivided into virtual addresses (not shown). The virtual memory address space (202) may be identical to each client device (210). In this manner, each client device (200, 210) has access to all virtual memory regions (202A, 202M) in the virtual memory address space (202).

In one or more embodiments of the invention, each virtual memory region (202A, 202M) maps to a persistent memory region. FIG. 2B shows a diagram of a set of persistent memory servers. Each persistent memory server (212, 214) hosts a persistent memory region (212A, 212M). Each persistent memory region (212A, 212M) is implemented using a set of persistent memory devices (e.g., 170, FIG. 1C) discussed above.

FIG. 2C shows a diagram of the relationship between the virtual address space and the persistent memory regions. The virtual memory address space (202), as discussed in FIG. 2A, includes any number of virtual memory regions. Each virtual memory region maps to a persistent memory region hosted by the persistent memory servers (212, 214, 216). For example, virtual memory region A maps to persistent memory region A hosted by persistent memory server A (212), virtual memory region B (shown in FIG. 2C) maps to persistent memory region B hosted by persistent memory server B (216), and virtual memory region M maps to persistent memory region M hosted by persistent memory server M (214).

FIG. 3A shows a flowchart for obtaining application requests at a client device in accordance with one or more embodiments of the invention. The method shown in FIG. 3A may be performed by, for example, a virtual memory manager (146, FIG. 1B) of a client device. Other components of the system illustrated in FIGS. 1A-1C may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to the method, in step 300 (FIG. 3A), an application request to access data is obtained. The application request may specify writing data to a virtual address in memory. The application request may be obtained from an application executing on the client device.

In step 302 (FIG. 3A), a persistent memory address is identified. In one or more embodiments, the persistent memory address is a physical address of a persistent memory device in a persistent memory server. The persistent memory address may be associated with a persistent memory region. The virtual memory manager may identify the persistent memory region mapped to the virtual memory region, and identify the persistent memory server hosting the identified persistent memory region.

In one or more embodiments, after identifying the persistent memory server associated with the specified virtual address, the virtual memory manager determines a networking interface that may be used to access the persistent memory server. For example, the client may have three RNICs, each including functionality to access one of the RDMA fabric devices in the RDMA fabric network. Each RNIC may be aware of which persistent memory servers are connected to the RDMA fabric devices. Using this information, the virtual memory manager may determine the RNIC to use to access the identified persistent memory address.

In step 304 (FIG. 3A), a RDMA request is transmitted to a RDMA network fabric. In one or more embodiments of the invention, the RDMA request is a translation of the application address discussed above. The RDMA request may be in a format readable to the RDMA fabric device. The RDMA request may specify the persistent memory address discussed in step 302 and the type of request (e.g., write data to, read data from) associated with the persistent memory address. The RDMA request may be transmitted via the identified networking interface (e.g., RNIC) of the client device.

In one or more embodiments of the invention, the RDMA request discussed above is processed in accordance with FIG. 3B by the RDMA fabric device. The RDMA request may be processed via any other method and by any other entity without departing from the invention.

Figure 3B:
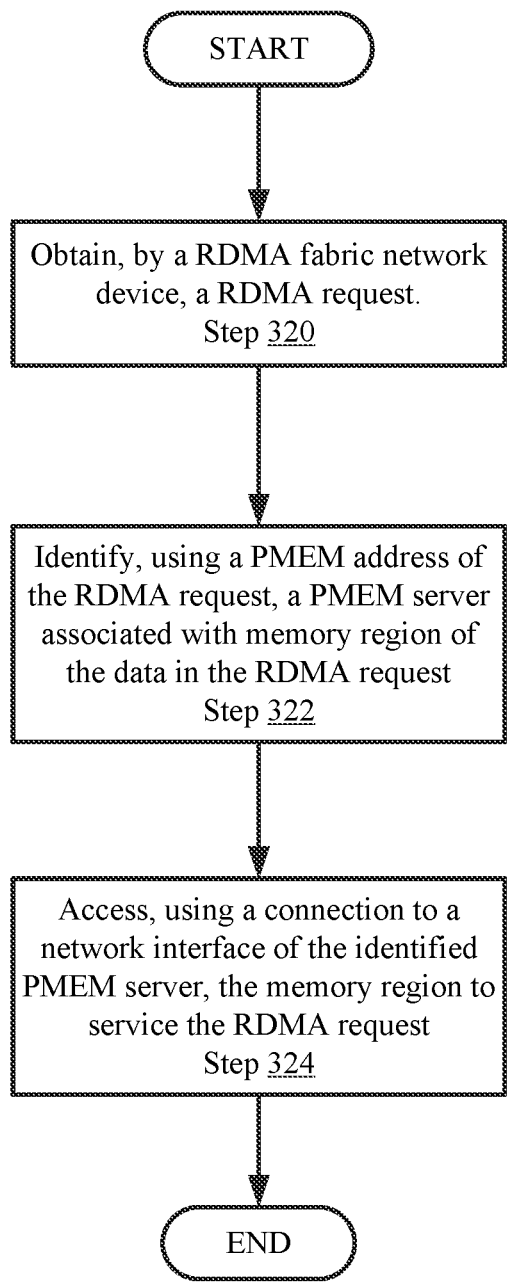
FIG. 3B shows a flowchart for obtaining requests to access data at a remote direct memory access (RDMA) fabric device in accordance with one or more embodiments of the invention.

FIG. 3B shows a flowchart for obtaining requests to access data at a remote direct memory access (RDMA) fabric device in accordance with one or more embodiments of the invention. The method shown in FIG. 3B may be performed by, for example, a RDMA fabric device (122, FIG. 1A). Other components of the system illustrated in FIGS. 1A-1C may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320 (FIG. 3B), the RDMA request is obtained. In one or more embodiments of the invention, the RDMA request obtained by the RDMA fabric device is the RDMA request transmitted in FIG. 3A. The RDMA request may be obtained by a networking interface of the RDMA fabric device. As discussed above, the RDMA request may specify a persistent memory address.

In step 322 (FIG. 3B), the PMEM server associated with the persistent memory address specified in the RDMA request is identified. In one or more embodiments, the RDMA may include a mapping that associates the persistent memory address to the persistent memory server and the corresponding persistent memory device of the persistent memory server. Such persistent memory server and persistent memory device are identified.

In step 324 (FIG. 3B), the identified persistent memory server is accessed to service the RDMA request. In one or more embodiments, the persistent memory server is accessed using a networking interface of the RDMA fabric device operatively connected to a second networking device of the persistent memory server. The RDMA fabric device may access the persistent memory device without the use of the processor (e.g., the processor cores) of the persistent memory server. In this manner, the persistent memory server may continue operation on the compute processor set (e.g., executing other applications, performing other processes, etc.) without the servicing of the RDMA request significantly affecting the operation.

In one or more embodiments of the invention, the RDMA request is a read request. Servicing the read request may include obtaining a copy of the data and providing the copy of the data to the client device.

In one or more embodiments of the invention, the RDMA request is a write request. Servicing the write request may include writing specified data to the persistent memory address and providing an acknowledgement (e.g., an ACK) that the data was written as requested.

In one or more embodiments, the RDMA fabric device utilizes the processor dedicated memory (e.g., cache) of the persistent server to service the RDMA request. For example, because of the speed of access to data stored in the processor dedicated memory, the RDMA request may temporarily store obtained data, or data to be written, in the processor dedicated memory. These embodiments may be beneficial in such scenarios in which the processor dedicated memory is available (e.g., if the processor cores are not utilizing it).

In other embodiments, the RDMA fabric device does not utilize the processor dedicated memory (e.g., cache) of the persistent server to service the RDMA request. These embodiments may be beneficial in such scenarios in which the processor dedicated memory is already in use by the processor cores (e.g., to execute other processes) and is not available for the servicing of the RDMA request.

EXAMPLE

Figure 4A:
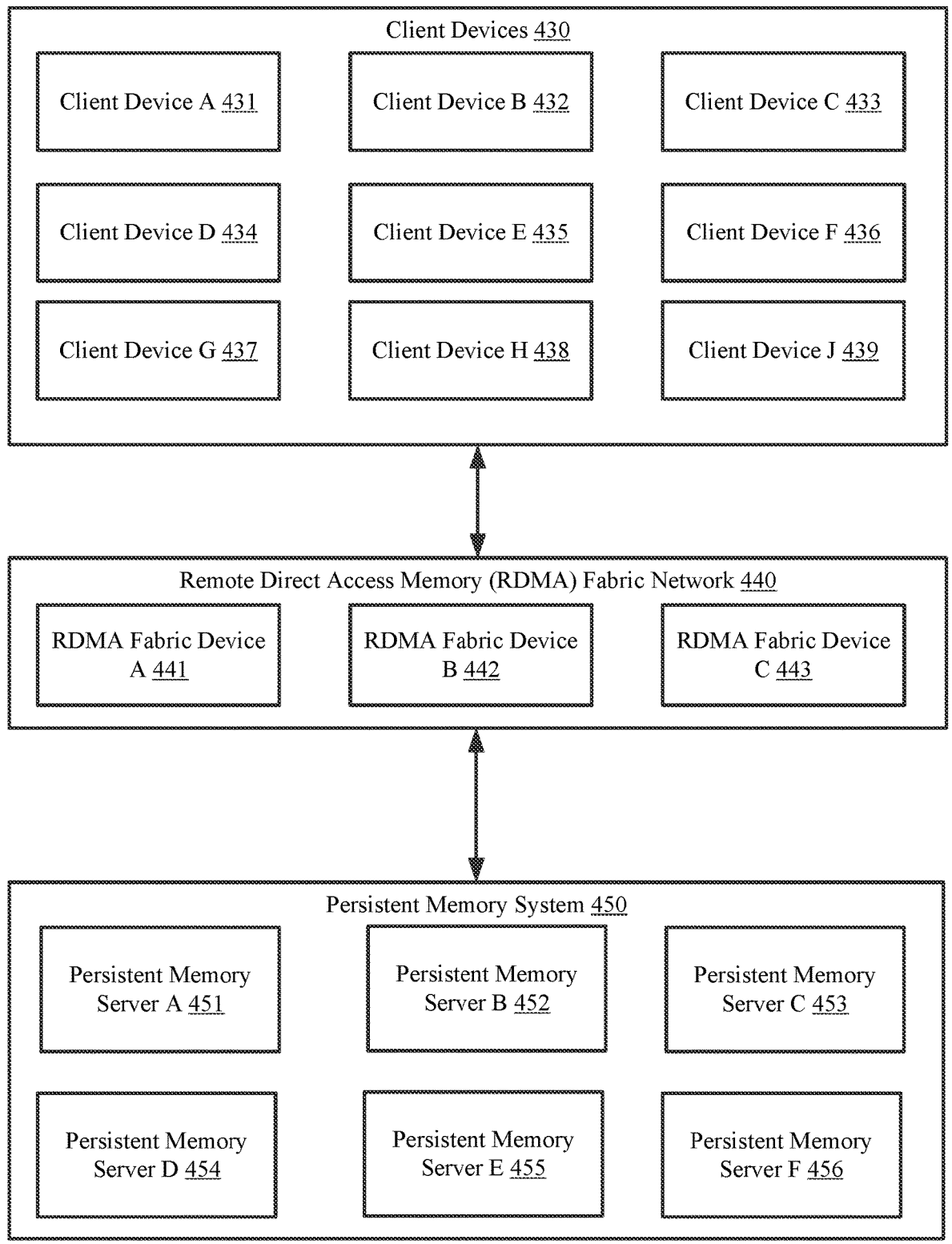
FIGS. 4A-4C show an example in accordance with one or more embodiments of the invention.
Figure 4B:
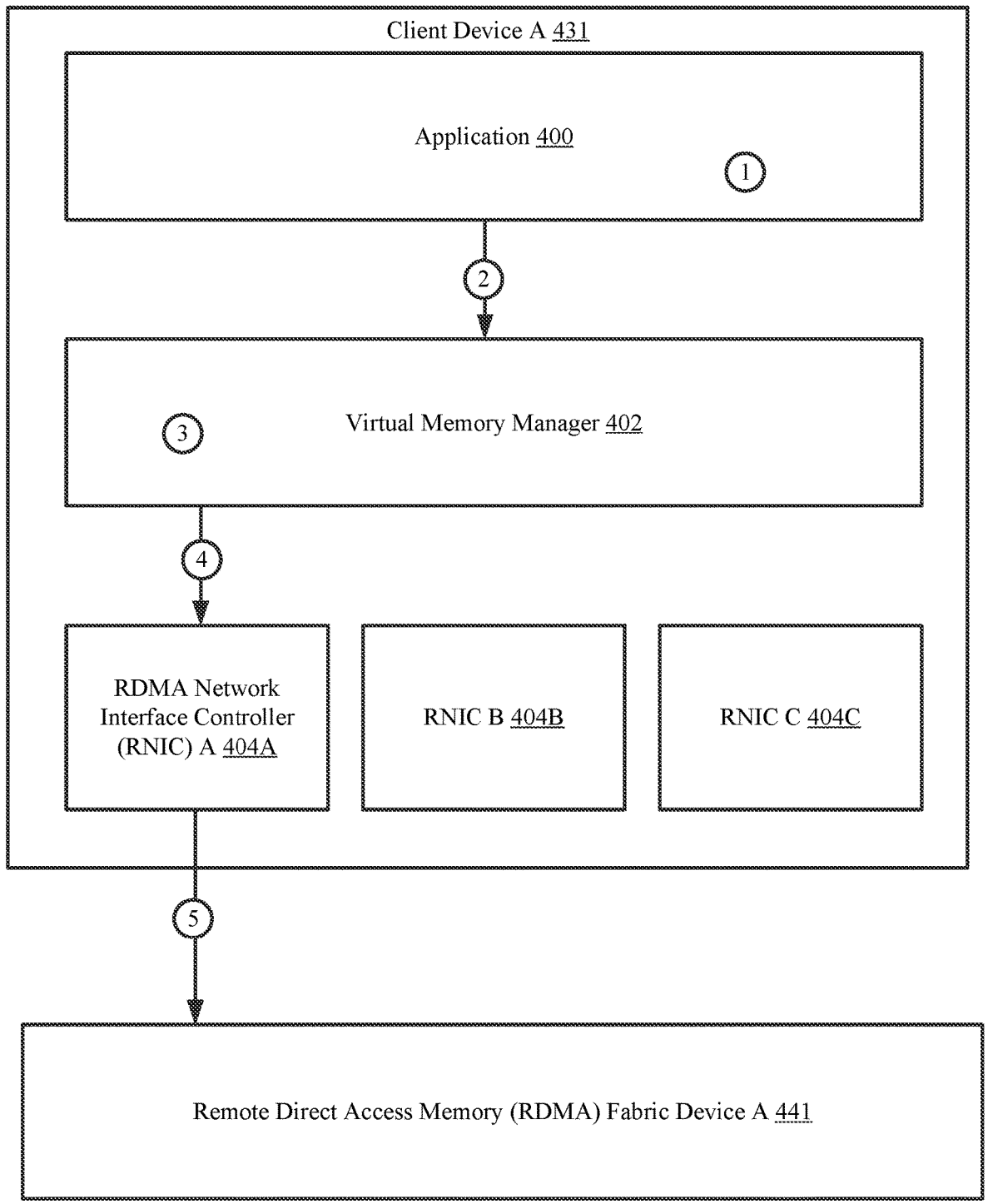
Figure 4C:
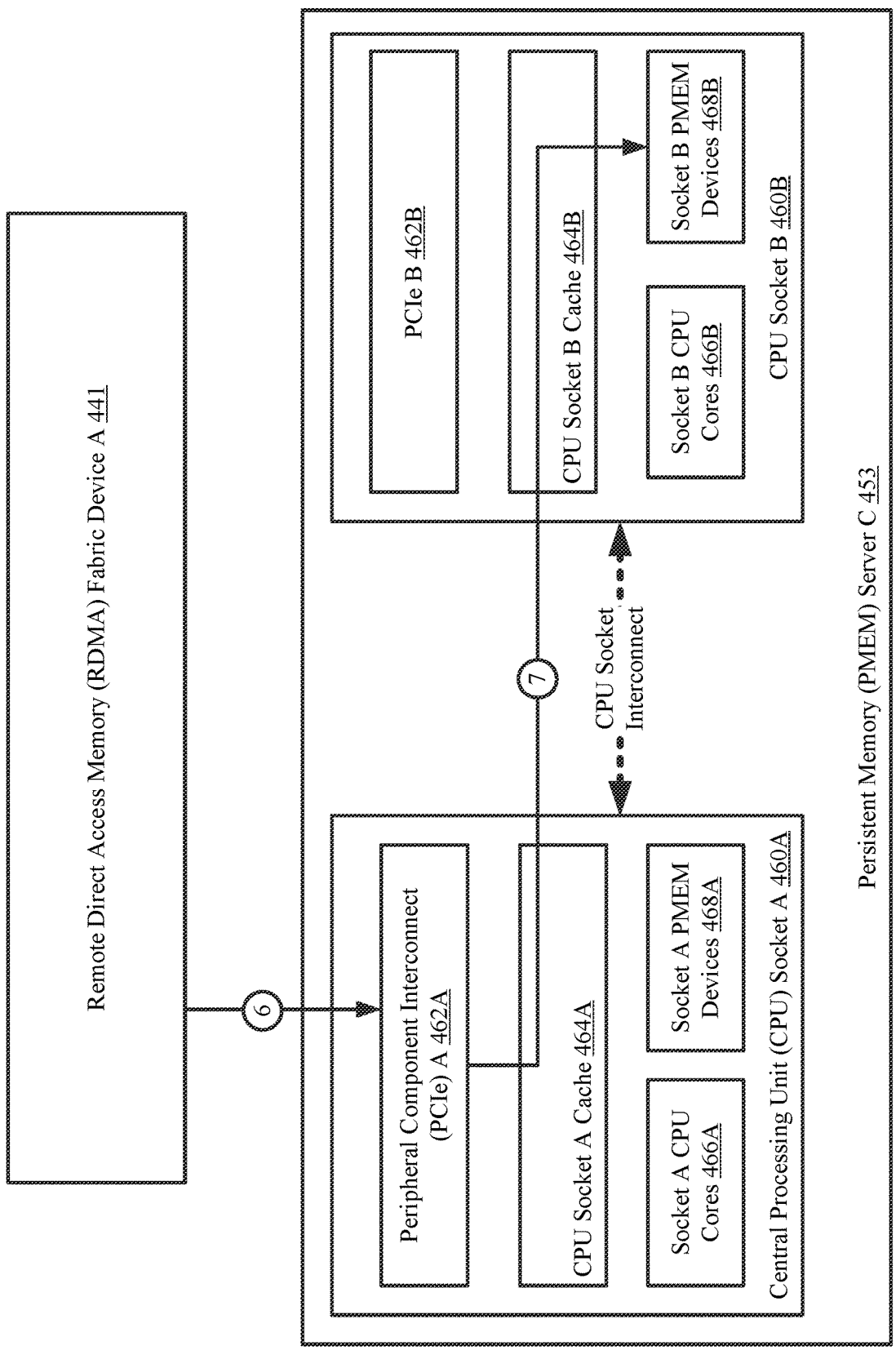

The following section describes an example. The example is not intended to limit the invention. The example is illustrated in FIGS. 4A-4C. Turning to the example, consider a scenario in which a system includes a set of client devices that utilize a RDMA fabric network and a remote persistent memory system.

FIG. 4A shows an example system. The example system includes nine client devices (430). The client devices include client device A (431), client device B (432), client device C (433), client device D (434), client device E (435), client device F (436), client device G (437), client device H (438), and client device J (439). The client devices (430) each have a direct connection to three remote memory direct access (RDMA) (440) fabric devices (441, 442, 443) in a RDMA fabric network (440). The RDMA fabric devices include RDMA fabric device A (441), RDMA fabric device B (442), and RDMA fabric device C (443). Each RDMA fabric device (441, 442, 443) further includes a connection to two or more persistent memory servers in a persistent memory system (450). The persistent memory system (450) includes persistent memory server A (451), persistent memory server B (452), persistent memory server C (453), persistent memory server D (454), persistent memory server E (455), and persistent memory server F (456).

Each of the persistent memory servers (451, 452, 453, 454, 455, 456) hosts six persistent memory region (not shown) that is implemented using persistent memory devices (further discussed in FIG. 4C). For example, persistent memory server A (451) hosts persistent memory region PA.1-PA.6, persistent memory server B (452) hosts persistent memory region PB.1-PB.6, persistent memory server C (453) hosts persistent memory region PC.1-PC.6, persistent memory server D (454) hosts persistent memory region PD.1-PD.6, persistent memory server E (455) hosts persistent memory region PE.1-PE.6, and persistent memory server F (456) hosts persistent memory region PF.1-PF.6. Collectively, persistent memory regions PA.1-PF.6 include the persistent memory provided to the client devices (430). In this example, the persistent memory is used for a global file system (hereinafter referred to as a persistent memory file system or "PMEM-FS") utilized by the client devices (430).

Further, in this example, each persistent memory server (451, 452, 453, 454, 455, 456) includes two CPU sockets (not shown). The six persistent memory regions in a persistent memory server may be implemented by persistent memory devices divided between the two CPU sockets. Additional details regarding the topology of a persistent memory server is further described in FIG. 4C.

Continuing the discussion of FIG. 4A, each RDMA fabric device (441, 442, 443) is installed in a non-blocking manner. As discussed above, the non-blocking manner relates to a method of connection that does not require more than one RDMA fabric device (441, 442, 443) to operably connect a client device (431, 432, 433, 434, 435, 436, 437, 438, 439) to a persistent memory server (451, 452, 453, 454, 455, 456). While not shown in FIG. 4A, each RDMA fabric device (441, 442, 443) includes six networking interfaces that each connect to a networking interface of a persistent memory server (451, 452, 453, 454, 455, 456). In this example, two networking interfaces of an RDMA fabric device may be used to access three persistent memory regions of one persistent memory server (451, 452, 453, 454, 455, 456).

Turning to FIG. 4B, client device A (431) includes an application (400) that utilizes the PMEM-FS. The access to the PMEM-FS by the application (400) is managed by a virtual memory manager (402) of client device A (431). The virtual memory manager may implement a virtual memory address space (not shown) that maps virtual memory regions to one of the persistent memory regions (e.g., PA.1-PF.6) in the persistent memory system. Client device A (431) further includes three RDMA network interface controllers (RNICs) (404A, 404B, 404C). Each RNIC (404A, 404B, 404C) is programmed to connect to one of the three RDMA fabric devices (441, 442, 443) discussed above. In this example, RNIC A (404A) operably connects to RDMA fabric device A (441), RNIC B (404B) operably connects to RDMA fabric device B (442), and RNIC C (404C) operably connects to RDMA fabric device C (443).

In the following example, a sequence of operations illustrated in FIGS. 4B-4C as the circled numbers are described below using brackets (e.g., "[1]").

The application (400) determines that it wants to write data to persistent memory [1]. The application (400) sends an application request that specifies storing data in a virtual address [2]. The virtual memory manager (402) obtains the application request and performs the method of FIG. 3A to identify the persistent memory address associated with the virtual address using the virtual memory address space. After identifying the persistent memory address, the virtual memory manager (402) identifies the persistent memory region associated with the persistent memory address. Further, virtual memory manager (402) identifies the RDMA fabric device (441) that is operatively connected to the persistent memory region. The virtual memory manager (402) generates a RDMA request that is in a format readable to a RDMA fabric device [3]. Further), based on the identification, the virtual memory manager (402) transmits the RDMA request to RNIC A (404A), which is connected to the RDMA fabric device that can access the identified persistent memory region [4]. RNIC A (404A) transmits the RDMA request to RDMA fabric device A (441).

Turning to FIG. 4C, the RDMA fabric device (441) performs the method of FIG. 3B to identify the persistent memory region associated with the persistent memory address of the RDMA request. The RDMA fabric device (441) determines that the persistent memory address is associated with persistent memory region PC.5 (not shown). PC.5 is hosted by persistent memory server C (453). As illustrated in FIG. 4C, persistent memory server C (453) includes two CPU sockets: CPU socket A (460A) and CPU socket B (460B). Each CPU socket (460A, 460B) includes a PCIe (462A, 462B), CPU socket cache (464A, 464B), a set of CPU cores (466A, 466B), and three of the persistent memory devices (468A, 468B). As discussed above, each persistent memory device is associated with a persistent memory region. PC.5 is hosted by one of the persistent memory devices (468B) connected to CPU socket B (460B). As illustrated in FIG. 4C, RDMA fabric device A (441) connects to persistent memory server C (453) via PCIe A (462A) of CPU socket A (460A). To access PC.5 in CPU socket B (460B), RDMA A (441) connects to PCIe A (462A), stores the RDMA request in CPU socket A cache (464A), accesses CPU socket B cache (464B) of CPU socket B (460B) via a CPU socket interconnect, and services the RDMA request (e.g., the write request to the persistent memory address in PC.5) using the CPU socket B cache (464B) and the persistent memory devices (468B) of CPU socket B (460B) [7].

In this example, the CPU cores (466A, 466B) execute processes that are not related to the RDMA request, nor do they utilize the persistent memory devices (468A, 468B). Further, the CPU cores (466A, 466B) do not utilize all of the respective cache (464A, 464B). As such, some of the cache (464A, 464B) is available for use for the servicing of the RDMA request and future RDMA requests.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the availability of the storage of data. By storing data in persistent memory, embodiments provide the speed of volatile memory and the persistence of persistent storage. Further, embodiments of the invention improve the resource use of client devices utilizing memory by introducing a persistent memory system remote to the client devices that provide significantly similar speed (e.g., low latency) and reliability of persistent memory. The persistent memory system minimizes overloading resource devices by including multiple persistent memory servers that each bear a load (e.g., as a persistent memory region) of the persistent memory offered to the client devices.

Further, embodiments of the invention improve the operation of the persistent memory system by utilizing a network that operatively connects the client devices to the persistent memory server via RDMA-capable fabric devices that include functionality for directly accessing the persistent memory regions without requiring the use of the processing cores of the persistent memory servers hosting the persistent memory regions.

Thus, embodiments of the invention may address the problem of inefficient use of computing resources. This problem arises due to the technological nature of the environment in which resource devices are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A system for managing data, comprising:
   a client device, comprising:
      a virtual memory address space;
      a virtual memory manager managing the virtual memory address space; and
      a networking interface connected to a remote direct memory access (RDMA) fabric device of a plurality of RDMA fabric devices;
   a RDMA fabric network comprising the plurality of RDMA fabric devices; and
   a persistent memory (PMEM) system comprising a plurality of PMEM servers,
      wherein the plurality of PMEM servers comprises a PMEM server,
      wherein the PMEM server comprises a PMEM region,
      wherein the PMEM region corresponds to a portion of the virtual memory address space, and
      wherein the PMEM server further comprises:
         a first processor socket comprising a first processor core and a networking interface,
         a second processor socket comprising a second processor core,
         a plurality of PMEM devices, and
         a peripheral component interconnect express (PCIe) device,
   wherein the RDMA fabric device of the plurality of RDMA fabric devices is programmed to:
      obtain a RDMA request, associated with data, from the client device, wherein the RDMA request specifies a PMEM address of the PMEM region, wherein the PMEM region comprises the plurality of PMEM devices;
      identify a PMEM server of the plurality of PMEM servers based on the PMEM address; and
      access, without the use of the first processor core or the second processor core, the PMEM region of the PMEM server using the networking interface, the PCIe device, and an interconnect between the first processor socket and the second processor socket to service the RDMA request, and wherein the PMEM address corresponds to persistent memory in the second processor socket,
   wherein the RDMA fabric device operates in a non-blocking manner relative to other RDMA fabric devices of the plurality of RDMA fabric devices, and
   wherein the non-blocking manner enables the RDMA fabric device to not require the use of any of the other RDMA fabric devices to service the RDMA request.

2. The system of claim 1,
   wherein the PMEM server further comprises cache, and
   wherein accessing the PMEM region comprises utilizing the cache to access the data stored in the PMEM region.

3. The system of claim 1, wherein the RDMA fabric device is further programmed to:
   obtain a second RDMA request from the client device, wherein the second RDMA request specifies a second PMEM address of a second PMEM region;
   identify a second PMEM server of the plurality of PMEM servers; and
   access the second PMEM region using the second PMEM server to service the second RDMA request.

4. The system of claim 1,
   wherein the RDMA request is a write request, and
   wherein servicing the RDMA request comprises writing the data to the PMEM address of the PMEM region.

5. The system of claim 1,
   wherein the RDMA request is a read request, and
   wherein servicing the RDMA request comprises obtaining a copy of the data stored in the PMEM address of the PMEM region.

6. The system of claim 1, wherein the client device further comprises:
   an application,
   wherein the virtual memory manager is programmed to:
      obtain an application request from the application;
      identify the PMEM address in the PMEM region based on the application request and using the virtual memory address space; and
      generate the RDMA request using the PMEM address and the application request.

7. The system of claim 1, wherein the networking interface is a RDMA network interface controller (RNIC).

8. A method for managing storage of data, comprising:
   obtaining, by a remote direct memory access (RDMA) fabric device of a plurality of RDMA fabric devices, a RDMA request, associated with data, from a client device,
   wherein the RDMA request specifies a persistent memory (PMEM) address of a PMEM region, wherein the client device comprises:
  a virtual memory address space;
  a virtual memory manager managing the virtual memory address space; and
  a networking interface connected to the RDMA fabric device;
identifying a PMEM server of a plurality of PMEM servers based on the PMEM address,
  wherein the PMEM server comprises:
    a first processor socket comprising a first processor core and a networking interface;
    a second processor socket comprising a second processor core; and
    the PMEM region comprising a plurality of PMEM devices,
      wherein the PMEM region corresponds to a portion of the virtual memory address space, and
    a peripheral component interconnect express (PCIe) device; and
accessing, without the use of the first processor core or the second processor core, the PMEM region using the networking interface, the PCIe device, and an interconnect between the first processor socket and the second processor socket to service the RDMA request,
wherein the PMEM address corresponds to persistent memory in the second processor socket,
wherein a RDMA fabric network is operatively connected to the client device and to the PMEM server,
wherein the RDMA fabric network comprises the plurality of RDMA fabric devices,
wherein the RDMA fabric device operates in a non-blocking manner relative to other RDMA fabric devices of the plurality of RDMA fabric devices, and
wherein the non-blocking manner enables the RDMA fabric device to not require the use of any of the other RDMA fabric devices to service the RDMA request.

9. The method of claim 8, further comprising:
obtaining a second RDMA request from the client device, wherein the second RDMA request specifies a second PMEM address of a second PMEM region;
identifying a second PMEM server of the plurality of PMEM servers; and
accessing the second PMEM region using the second PMEM server to service the second RDMA request.

10. The method of claim 8,
wherein the RDMA request is a write request, and
wherein servicing the RDMA request comprises writing the data to the PMEM address of the PMEM region.

11. The method of claim 8,
wherein the RDMA request is a read request, and
wherein servicing the RDMA request comprises obtaining a copy of the data stored in the PMEM address of the PMEM region.

12. A non-transitory computer readable medium comprising computer readable program code, which when executed by a computer processor enables the computer processor to perform a method for managing data, comprising:
obtaining, by a remote direct memory access (RDMA) fabric device of a plurality of RDMA fabric devices, a RDMA request, associated with data, from a client device,
wherein the RDMA request specifies a persistent memory (PMEM) address of a PMEM region,
wherein the client device comprises:
  a virtual memory address space;
  a virtual memory manager managing the virtual memory address space; and
  a networking interface connected to the RDMA fabric device;
identifying a PMEM server of a plurality of PMEM servers based on the PMEM address,
  wherein the PMEM server comprises:
    a first processor socket comprising a first processor core and a networking interface;
    a second processor socket comprising a second processor core;
    the PMEM region comprising a plurality of PMEM devices, and
    a peripheral component interconnect express (PCIe) device,
      wherein the PMEM region corresponds to a portion of the virtual memory address space; and
accessing, without the use of the first processor core or the second processor core, the PMEM region using the networking interface, the PCIe device, and an interconnect between the first processor socket and the second processor socket to service the RDMA request,
wherein the PMEM address corresponds to persistent memory in the second processor socket,
wherein a RDMA fabric network is operatively connected to the client device and to the PMEM server,
wherein the RDMA fabric network comprises the plurality of RDMA fabric devices,
wherein the RDMA fabric device operates in a non-blocking manner relative to other RDMA fabric devices of the plurality of RDMA fabric devices, and
wherein the non-blocking manner enables the RDMA fabric device to not require the use of any of the other RDMA fabric devices to service the RDMA request.

13. The non-transitory computer readable medium of claim 12, further comprising:
obtaining a second RDMA request from the client device, wherein the second RDMA request specifies a second PMEM address of a second PMEM region;
identifying a second PMEM server of the plurality of PMEM servers; and
accessing the second PMEM region using the second PMEM server to service the second RDMA request.

14. The non-transitory computer readable medium of claim 12,
wherein the RDMA request is a write request, and
wherein servicing the RDMA request comprises writing the data to the PMEM address of the PMEM region.

15. The non-transitory computer readable medium of claim 12,
wherein the RDMA request is a read request, and
wherein servicing the RDMA request comprises obtaining a copy of the data stored in the PMEM address of the PMEM region.

* * * * *